US009599232B2

(12) United States Patent
Yoshimura

(10) Patent No.: US 9,599,232 B2
(45) Date of Patent: Mar. 21, 2017

(54) SINGLE COIL DUAL SOLENOID VALVE

(71) Applicant: RINNAI CORPORATION, Nagoya-shi, Aichi (JP)

(72) Inventor: Kimihiro Yoshimura, Nagoya (JP)

(73) Assignee: RINNAI CORPORATION, Nagoya-shi, Aichi (JP)

( * ) Notice: Subject to any disclaimer, the term of this patent is extended or adjusted under 35 U.S.C. 154(b) by 113 days.

(21) Appl. No.: 14/532,667

(22) Filed: Nov. 4, 2014

(65) Prior Publication Data
US 2016/0123476 A1    May 5, 2016

(51) Int. Cl.
*F16K 1/52*     (2006.01)
*F16K 31/06*    (2006.01)
*F16K 27/02*    (2006.01)

(52) U.S. Cl.
CPC .............. *F16K 1/52* (2013.01); *F16K 27/029* (2013.01); *F16K 27/0263* (2013.01); *F16K 31/0624* (2013.01); *F16K 31/0655* (2013.01); *F16K 31/0675* (2013.01); *F16K 31/0696* (2013.01)

(58) Field of Classification Search
CPC .... F16K 1/52; F16K 31/0675; F16K 31/0624; F16K 27/0263; F16K 31/0696; F16K 27/029; F16K 31/0655
USPC .............. 137/637, 883, 625.28, 862, 101.19, 137/599.07, 601.14, 870, 614.13, 6, 137/14.14; 251/65
See application file for complete search history.

(56) References Cited

U.S. PATENT DOCUMENTS

| 2,935,086 A | * | 5/1960 | Lehman | F16K 31/10 137/599.11 |
| 3,683,962 A | * | 8/1972 | Good | F16K 11/168 137/868 |
| 5,904,333 A | | 5/1999 | Kelly et al. | |

(Continued)

FOREIGN PATENT DOCUMENTS

| JP | 63130977 A | 6/1988 |
| JP | 10-2446 A | 1/1998 |
| JP | 2012122550 A | 6/2012 |

OTHER PUBLICATIONS

Japanese Office Action dated Oct. 6, 2015, issued in counterpart Japanese patent application No. 2013-184126, with English translation. (10 pages).

*Primary Examiner* — Michael R Reid
*Assistant Examiner* — Patrick Williams
(74) *Attorney, Agent, or Firm* — Westerman, Hattori, Daniels & Adrian, LLP

(57) ABSTRACT

A single coil dual solenoid valve includes: first and second moving cores having connected to respective ends thereof first and second valve bodies; first and second plunger tubes having slidably inserted thereinto the first and second moving cores, respectively; first and second stationary cores disposed at respective opposite ends of the first and second plunger tubes so as to lie opposite to the first and second moving cores, respectively; a first frame disposed to connect the first and second stationary cores; a second frame disposed to connect one end of the first and second plunger tubes, respectively; and a single solenoid disposed to enclose one of the first and second plunger tubes. By activating the solenoid, the first and second moving cores are sucked to move toward the respective first and second stationary cores, whereby the first and second valve bodies are changed over.

4 Claims, 3 Drawing Sheets

(56) References Cited

U.S. PATENT DOCUMENTS

| | | | | |
|---|---|---|---|---|
| 7,779,867 B2* | 8/2010 | Bai | ............................ | F16K 7/14 |
| | | | | 137/625.44 |
| 8,104,510 B2* | 1/2012 | Ams | ...................... | F16K 11/052 |
| | | | | 137/625.44 |
| 8,235,064 B2* | 8/2012 | Kasprzyk | ............ | F16K 31/0655 |
| | | | | 137/1 |

* cited by examiner

SINGLE COIL DUAL SOLENOID VALVE

BACKGROUND OF THE INVENTION

1. Technical Field

The present invention relates to a single coil dual solenoid valve, i.e., a solenoid valve with a single magnetic coil and two plungers (two valve bodies).

2. Background Art

Formerly, in order to secure redundancy in prevention of leakage of a gas from a burner whose combustion operation is being stopped, a combustion apparatus is so arranged that two solenoid valves are interposed in series in a gas supply passage and that, even if one of the solenoid valves fails to be closed, the other of the solenoid valves can prevent the gas from leaking (see, for example, JP-1998-2446 A).

According to this prior art arrangement, there is provided a solenoid in each of the solenoid valves. It follows that two solenoid valves with two solenoids are required, resulting in an increase in the occupying space and the electric power consumption. Therefore, this prior art arrangement cannot meet the recent requirements for downsizing and electric power saving.

SUMMARY

Problems that the Invention is to Solve

In view of the above points, this invention has a problem of providing a single coil dual solenoid valve which changes over (or switches) two valve bodies with a single solenoid, and which attains downsizing and electric power saving.

Means for Solving the Problems

In order to solve the above-described problems, a single coil dual solenoid valve according to this invention comprises: a first valve body and a second valve body; a first moving core and a second moving core having connected to one end thereof the first valve body and the second valve body, respectively; a first plunger tube and a second plunger tube having slidably inserted thereinto from open end provided at one end portion thereof the first moving core and the second moving core, respectively; a first stationary core and a second stationary core disposed at an opposite end portion of the first plunger tube and of the second plunger tube so as to lie opposite to the first moving core and the second moving core, respectively; a first buffer member and a second buffer member attached to the first moving core and the second moving core or to the first stationary core and the second stationary core so as to absorb shocks when the first moving core and the second moving core come into contact with the first stationary core and the second stationary core, respectively; a first valve spring and a second valve spring for biasing the first moving core and the second moving core away from the first stationary core and the second stationary core, respectively; a first frame disposed to connect the first stationary core and the second stationary core; a second frame disposed to connect the one end portion of the first plunger tube and of the second plunger tube, respectively; and a single solenoid disposed to enclose one of the first plunger tube and the second plunger tube. A magnetic path is formed starting from the first moving core through the first stationary core, the first frame, the second stationary core, the second moving core, the second frame and back to the first moving core. When the solenoid is activated, each of the first moving core and the second moving core is sucked to move against a biasing force of each of the first valve spring and the second valve spring toward the first stationary core and the second stationary core, respectively. As a result, the first valve body and the second valve body can be changed over.

According to this invention, it is possible to change over the first valve body and the second valve body, i.e., a total of two valve bodies, with a single solenoid. Therefore, as compared with the prior art arrangement having two solenoids, the valve according to this invention can be made smaller in size and electric power consumption.

Further, in this invention, it is preferable to make an arrangement that, when the solenoid is deactivated (i.e., not activated), the distance between the first stationary core or the first moving core and the first buffer member is different from the distance between the second stationary core or the second moving core and the second buffer member. According to this arrangement, when the solenoid is activated, the timing in which the first moving core comes into contact with the first stationary core through the first buffer member deviates from the timing in which the second moving core comes into contact with the second stationary core through the second buffer member. The noises (sounds of suction) to be generated at the time of contacts can be reduced.

This single coil dual solenoid valve according to this invention may be used to secure redundancy in preventing leaks of fluids. In other words, the single coil dual solenoid valve of this invention preferably further comprises a valve casing containing therein: a first valve chamber for housing therein the first valve body; a second valve chamber for housing therein the second valve body, the first valve chamber and the second valve chamber being disposed in series with each other; a first valve seat facing the first valve chamber; and a second valve seat facing the second valve chamber. Each of the first valve body and the second valve body is arranged to get seated against the first valve seat and the second valve seat, respectively, when the solenoid is deactivated or activated. In this manner, by doubly shutting off the flow passage inside the valve casing by means of the first valve body and the second valve body, the redundancy of fluid leak prevention can be secured.

Further, the single coil dual solenoid valve according to this invention can be used to change over the flow rates. In other words, the single coil dual solenoid valve preferably further comprises a valve casing containing therein: a first valve chamber for housing therein the first valve body; a second valve chamber for housing therein the second valve body, the first valve chamber and the second valve chamber being disposed in parallel with each other; a first valve seat which faces the first valve chamber and against which the first valve body can be seated; a second valve seat which faces the second valve chamber and against which the second valve body can be seated. When the solenoid is activated, one of the first valve body and the second valve body gets seated against corresponding one of the first valve seat and the second valve seat and, when the solenoid is deactivated, the other of the first valve body and the second valve body gets seated against the other of the corresponding first valve seat and the second valve seat. As a result, the flow rate is changed over depending on the activation or deactivation of the solenoid.

Further, the single coil dual solenoid valve according to this invention can be used to control the flow of two kinds of fluids. In other words, the single coil dual solenoid valve preferably further comprises: a valve casing containing therein: a first flow passage having interposed therein a first valve chamber for housing therein the first valve body; a second flow passage having interposed therein a second valve chamber for housing therein the second valve body. The first flow passage and the second flow passage are disposed in parallel with each other. The single coil dual solenoid valve also comprises a first valve seat and a second valve seat which face the first valve chamber and the second valve chamber, respectively, and against which the first valve body and the second valve body are respectively seated when the solenoid is deactivated or activated. As a result, fluids different in kind can flow through the first flow passage and the second flow passage, respectively. In this arrangement, the flow control of two kinds of fluids, such as fuel gas and air, can be made.

According to this invention, in case the first valve body and the second valve body are different from each other in diameter, the solenoid is disposed to enclose the plunger tube into which is inserted the moving core to which is connected the valve body of larger diameter out of the first plunger tube and the second plunger tube. According to this arrangement, a larger magnetic suction force works by the moving core to which is connected the large-diameter valve body requiring a larger force for change-over operation. Therefore, even with a relatively smaller activation current value to the solenoid, the wrong operation due to insufficient suction force can be prevented, thereby contributing to the power saving.

DESCRIPTION OF PREFERRED EMBODIMENTS

Figure 1:
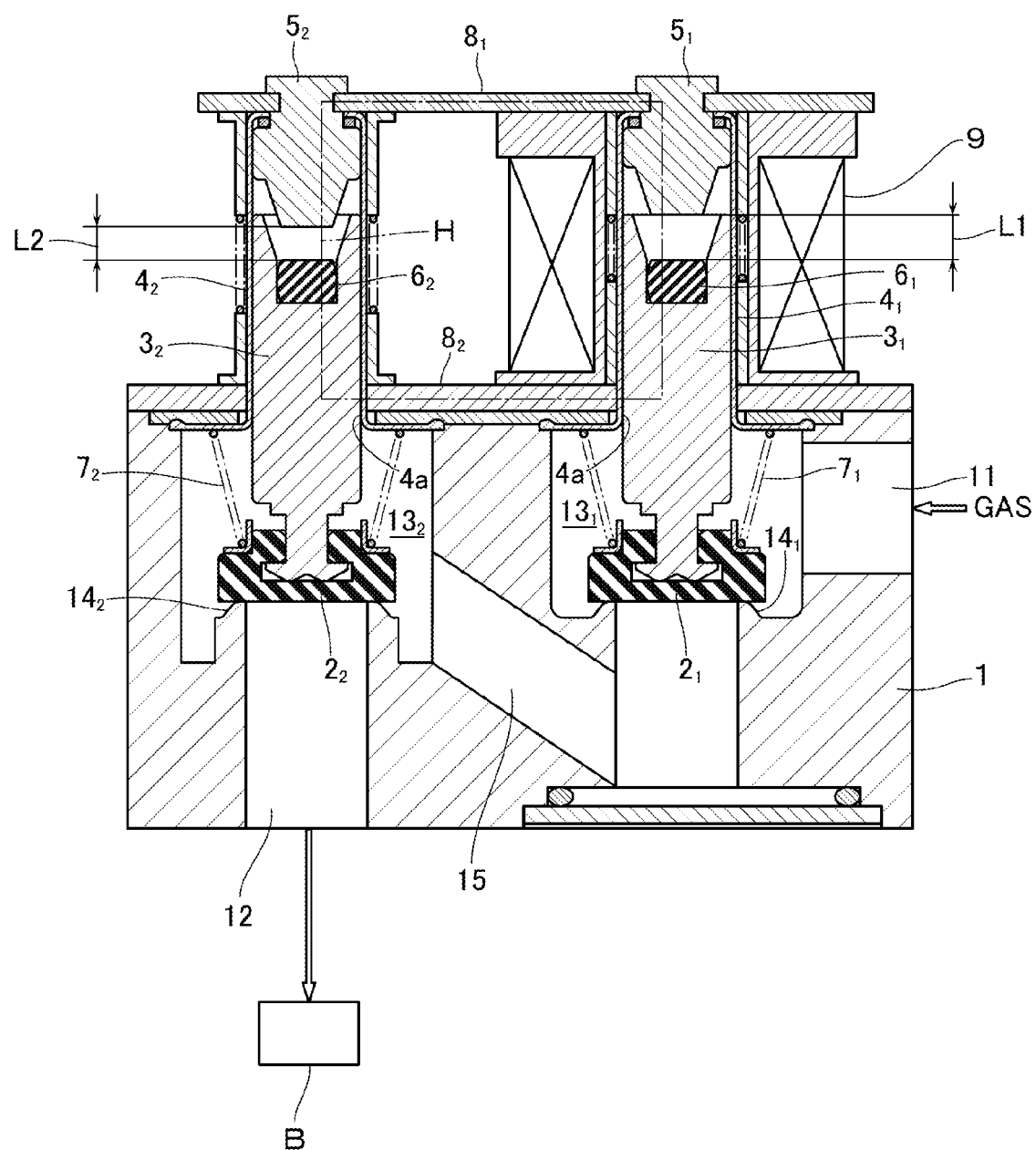
FIG. 1 is a sectional view of a single coil dual solenoid valve according to a first embodiment of this invention.

FIG. 1 illustrates a single coil dual solenoid valve which is intended to be interposed in a gas supply passage to a burner B according to a first embodiment of this invention. This single coil dual solenoid valve is provided with: a first valve body $2_1$ and a second valve body $2_2$ respectively housed in a valve casing 1; a first moving core $3_1$ and a second moving core $3_2$ having connected the first valve body $2_1$ and the second valve body $2_2$, respectively to one end (lower end in FIG. 1) of the first and second moving cores $3_1$, $3_2$; a first plunger tube $4_1$ and a second plunger tube $4_2$ into which each of the first and second moving cores $3_1$, $3_2$ is slidably inserted from open end 4a provided at one end portion of the first and second plunger tubes $4_1$, $4_2$, respectively; a first stationary core $5_1$ and a second stationary core $5_2$ disposed at respective opposite end portions (upper end in FIG. 1) of the first plunger tube $4_1$ and the second plunger tube $4_2$, respectively, so as to lie opposite to the first and second moving cores $3_1$, $3_2$; a first buffer member $6_1$ and a second buffer member $6_2$ disposed on each of the first and second moving cores $3_1$, $3_2$ so as to absorb the shocks at the time of contact of the first and second moving cores $3_1$, $3_2$ with the first and second stationary cores $5_1$, $5_2$, respectively; a first valve spring $7_1$ and a second valve spring $7_2$ for respectively biasing the first and second moving cores $3_1$, $3_2$ away from the first and second stationary cores $5_1$, $5_2$.

The single coil dual solenoid valve is further provided with: a first frame $8_1$ disposed to connect both the first and second stationary cores $5_1$, $5_2$ together; a second frame $8_2$ disposed to connect the one end portion (lower end portions in FIG. 1) of each of the first and second plunger tubes $4_1$, $4_2$; and a single solenoid 9 disposed so as to enclose one of the first and second plunger tubes $4_1$, $4_2$ (the first plunger tube $4_1$ in this embodiment). Then, as shown by a dashed line in FIG. 1, it is so arranged that a magnetic path H is formed starting from the first moving core $3_1$, through the first stationary core $5_1$, the first frame $8_1$, the second stationary core $5_2$, the second moving core $3_2$, and the second frame $8_2$ back to the first moving core $3_1$.

The valve casing 1 has an inlet 11 and an outlet 12. Inside the valve casing 1 there are disposed in series a first valve chamber $13_1$ which is in constant fluid communication with the inlet 11 and which houses the first valve body $2_1$, and a second valve chamber $13_2$ which houses the second valve body $2_2$. A first valve seat $14_1$ and a second valve seat $14_2$ against which the first and second valve bodies $2_1$, $2_2$ can be respectively seated are disposed to face the lower side of the first and second valve chambers $13_1$, $13_2$, respectively. It is thus so arranged that, as a result of the first valve body $2_1$ moving away from the first valve seat $14_1$, the first valve chamber $13_1$ comes into fluid communication with the second valve chamber $13_2$ through a flow communication path 15 and that, as a result of the second valve body $2_2$ moving away from the second valve seat $14_2$, the second valve chamber $13_2$ comes into fluid communication with the outlet 12.

When the solenoid 9 is deactivated, the first and second valve bodies $2_1$, $2_2$ get seated against the respective valve seats $14_1$, $14_2$ by the urging force of each of the first and second valve springs $7_1$, $7_2$. As a result, the gas flow passage between the inlet 11 and the outlet 12 is doubly blocked or shut off by the first valve body $2_1$ and the second valve body $2_2$, whereby the redundancy in prevention of gas leak from the burner B can be secured. When the solenoid 9 is activated, each of the first and second moving cores $3_1$, $3_2$ is sucked to move toward the first and second stationary cores $5_1$, $5_2$ against the biasing force of each of the valve springs $7_1$, $7_2$, respectively. As a result, each of the first and second valve bodies $2_1$, $2_2$ will be changed over to the "open" side which is away from each of the first and second valve seats $14_1$, $14_2$, whereby the gas flow passage is open to flow for the gas to be supplied to the burner B.

According to this embodiment, there is formed a continuous magnetic path 14 to pass through both the first and second moving cores $3_1$, $3_2$. Therefore, both the first and second valve bodies $2_1$, $2_2$ can be operated for changing over by means of the single solenoid 9. It follows that, as compared with an arrangement in which two solenoid valves having a solenoid respectively, this embodiment can be made smaller in size and electric power consumption.

Further, according to this embodiment, when the solenoid 9 is deactivated, the distance L1 between the first stationary core $5_1$ and the first buffer member $6_1$ is varied from the distance L2 between the second stationary core $5_2$ and the second buffer member $6_2$ so as to meet the condition of L1>L2, for example. According to this arrangement, when the solenoid 9 is activated, the timing for the first moving core $3_1$ to come into contact through the first buffer member $6_1$ with the first stationary core $5_1$ deviates from the timing for the second moving core $3_2$ to come into contact through the second buffer member $6_2$ with the second stationary core $5_2$. Therefore, as compared with an arrangement in which the first and second moving cores $3_1$, $3_2$ come into simultaneous contact with each of the first and second stationary cores $5_1$, $5_2$, the embodiment of this invention can reduce the sounds of suction that are the noises to be generated by contact.

Figure 2:
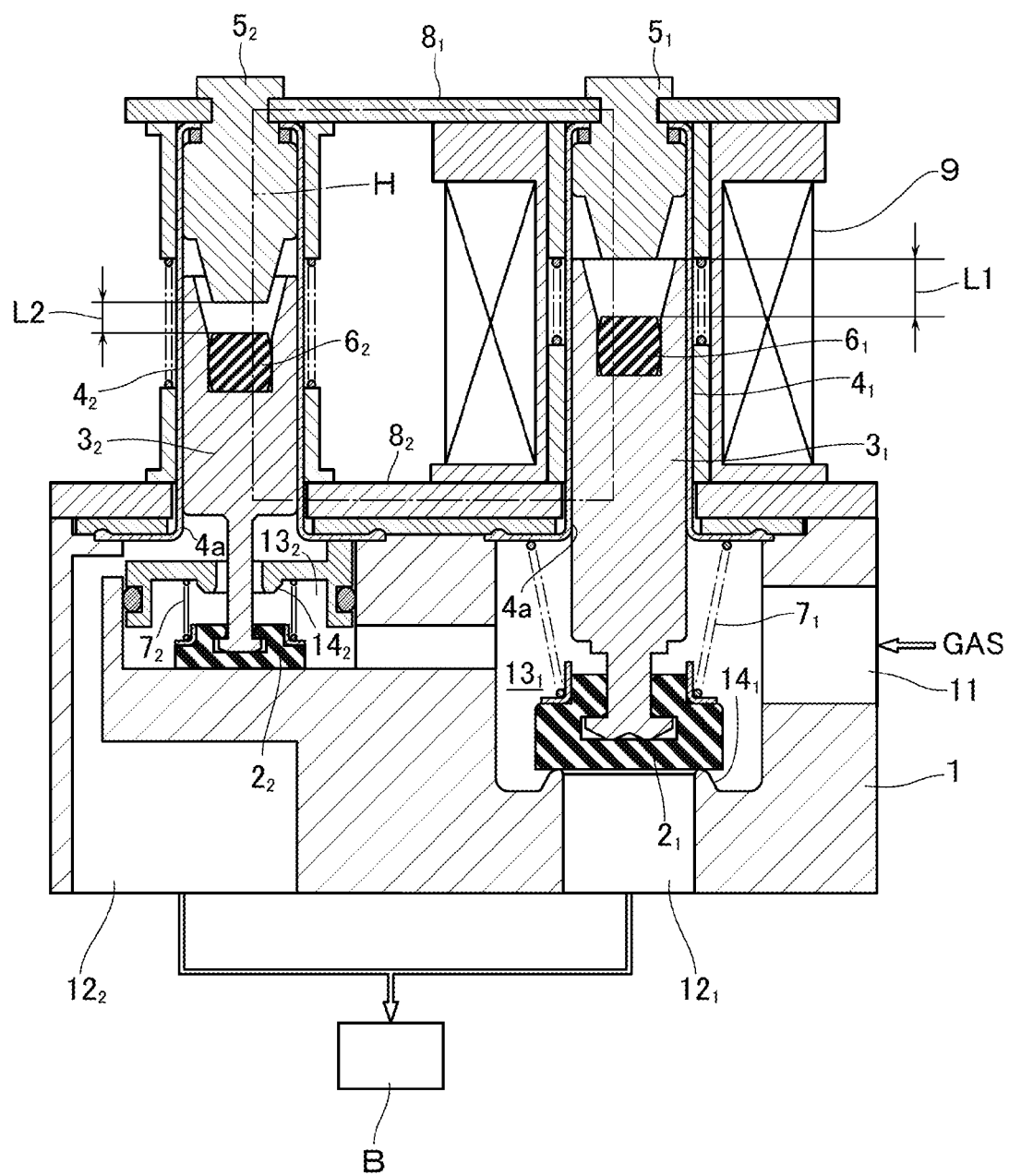
FIG. 2 is a sectional view of a single coil dual solenoid valve according to a second embodiment of this invention.

Now, with reference to FIG. 2, a description will now be made of a second embodiment of the single coil dual solenoid valve in which the flow rate of the gas to be supplied to the burner B is changed over. The basic construction of the single coil dual solenoid valve is the same as that of the first embodiment. The same reference numerals are assigned to the like members and parts as those of the above-described first embodiment.

The main difference between the second embodiment and the first embodiment lies in the construction of the valve casing 1. In other words, the valve casing 1 of the second embodiment is that it has a single inlet 11 and two outlet $12_1$, $12_2$. Inside the valve casing 1 there are disposed two valve chambers, i.e., a first valve chamber $13_1$ which houses the first valve body $2_1$ and a second valve chamber $13_2$ which houses the second valve body $2_2$ are disposed in parallel with each other. By the way, the first and second outlets $12_1$, $12_2$ are merged together for further connection to the downstream gas supply passage which is connected to the burner B.

In a manner to face the lower side of the first valve chamber $13_1$, there is provided the first valve seat $14_1$ against which the first valve body $2_1$ can be seated. It is thus so arranged that, when the first valve body $2_1$ leaves the first valve seat $14_1$, the first valve chamber $13_1$ comes into fluid communication with the first outlet $12_1$. Further, in a manner to face the upper side of the second valve chamber $13_2$, there is provided a second valve seat $14_2$ against which the second valve body $2_2$ can be seated. It is thus so arranged that, when the second valve body $2_2$ leaves the second valve seat $14_2$, the second valve chamber $13_2$ comes into fluid communication with the second outlet $12_2$.

The diameter of the opening in fluid communication with the first outlet $12_1$ that is formed in the first valve seat $14_1$ is far larger than the diameter of the opening in fluid communication with the second outlet $12_2$ that is formed in the second valve seat $14_2$. The diameter of the first valve body $2_1$ is far larger than the diameter of the second valve body $2_2$. In addition, the solenoid 9 is disposed to enclose the first plunger tube $4_1$ into which is inserted the first moving core $3_1$ having connected thereto the large-diameter first valve body $2_1$. Further, in the same manner as in the first embodiment, when the solenoid 9 is deactivated, the distance L1 between the first stationary core $5_1$ and the first buffer member $6_1$ is arranged to be different from the distance L2 between the second stationary core $5_2$ and the second buffer member $6_2$.

When the solenoid 9 is deactivated, the first valve body $2_1$ is seated against the first valve seat $14_1$ by the biasing force of the first valve spring $7_1$, whereby the inlet 11 and the first outlet $12_1$ are out of fluid communication with each other. On the other hand, the second valve body $2_2$ is away from the second valve seat $14_2$ by the biasing force of the second valve spring $7_2$ and the second outlet $12_2$ comes into fluid communication with the inlet 11. The flow rate of the gas to be supplied to the burner B thus becomes smaller. When the solenoid 9 is activated, the second valve body $2_2$ is seated against the second valve seat $14_2$ and, therefore, the fluid communication between the inlet 11 and the second outlet $12_2$ is shut off. On the other hand, the first valve body $2_1$ leaves the first valve seat $14_1$, and the first outlet $12_1$ comes into fluid communication with the inlet 11. As a result, the flow rate of the gas to be supplied to the burner B increases.

In this manner, depending on activation or deactivation of the solenoid 9, the flow rate of the gas flow can be changed over.

Further, since the solenoid 9 is disposed in a manner to enclose the first plunger tube $4_1$, a larger magnetic suction force is operated upon by the first moving core $3_1$ having connected thereto the large-diameter first valve body $2_1$ for which the required force for changing-over is larger. Therefore, even if the electric current value of activation of the solenoid 9 is made relatively small, poor operation due to lack of suction force can be prevented. Saving of the electric power consumption can this be attained.

Figure 3:
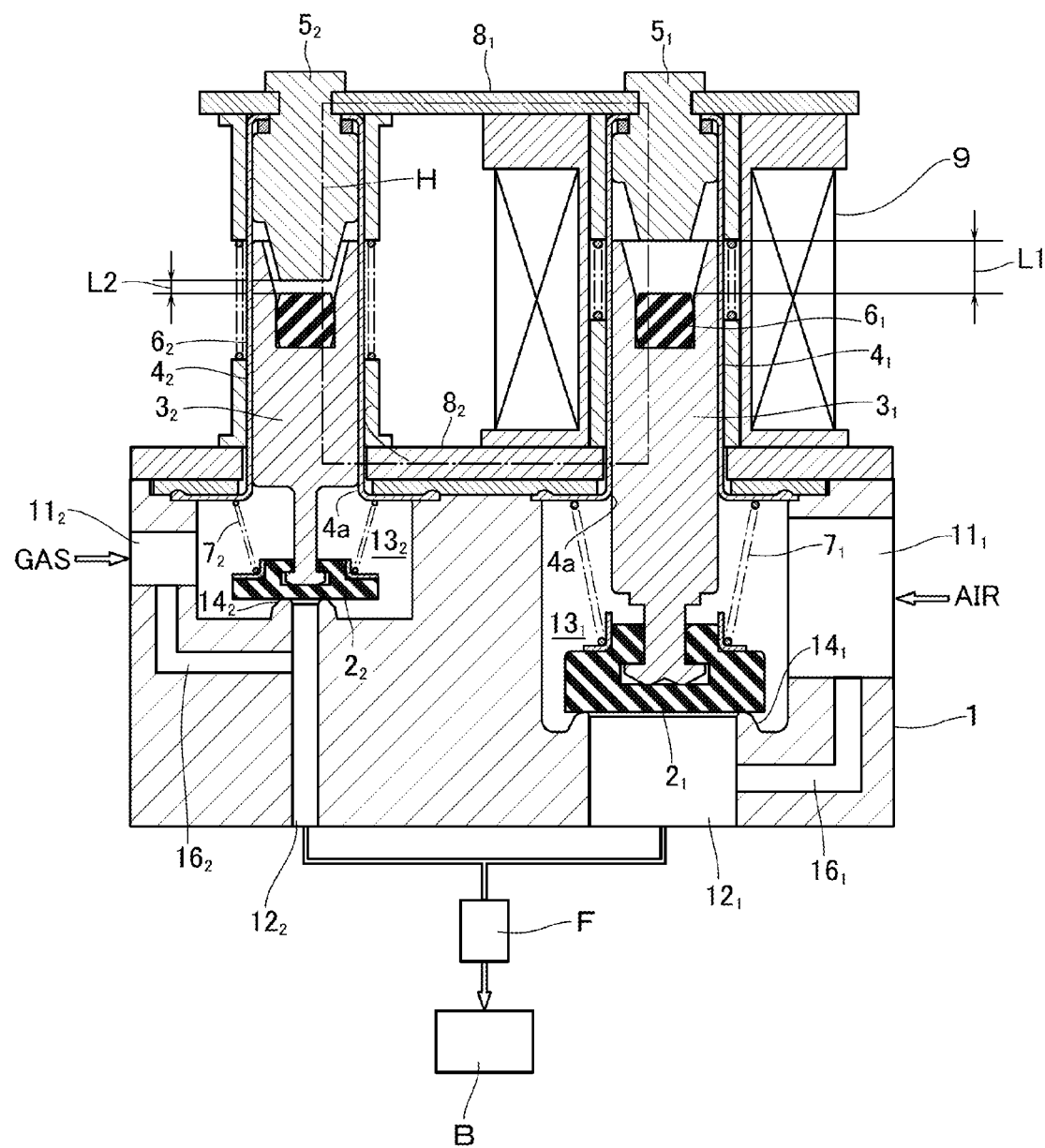
FIG. 3 is a sectional view of a single coil dual solenoid valve according to a third embodiment of this invention.

Now, with reference to FIG. 3, a description will now be made of a single coil dual solenoid valve of a third embodiment. This single coil dual solenoid valve is used to perform flow control of two kinds of fluids in the form of air and a fuel gas on the upstream side of a fan F that supplies the air-gas mixture to the burner B. The single coil dual solenoid valve of the third embodiment also has the same construction as that of the above-described first embodiment and, therefore, the same reference numerals are assigned to the like members and parts.

Inside the valve casing 1 of the single coil dual solenoid valve according to the third embodiment, there are disposed in parallel with each other: a first flow passage through which air flows from the first inlet $11_1$ to the first outlet $12_1$; and a second flow passage through which a fuel gas flows from the second inlet $11_2$ to the second outlet $12_2$. The first and second outlets $12_1$, $12_2$ are merged into one for further connection to the fan F.

The first flow passage has interposed therein: the first valve chamber $13_1$ in which the first valve body $2_1$ is housed and which is in fluid communication with the first inlet $11_1$; and a first bypass $16_1$ which brings the first inlet $11_1$ and the first outlet $12_1$ into fluid communication with each other without going through the first valve chamber $13_1$. Similarly, the second flow passage also has interposed therein: the second valve chamber $13_2$ in which the second valve body $2_2$ is housed and which is in fluid communication with the second inlet $11_2$; and a second bypass $16_2$ which brings the second inlet $11_2$ and the second outlet $12_2$ into fluid communication with each other without going through the second valve chamber $13_2$. Further, in a manner to face the lower side of the first valve chamber $13_1$, there is provided a first valve seat $14_1$ against which the first valve body $2_1$ can be seated. Also, in a manner to face the lower side of the second valve chamber $13_2$, there is provided a second valve seat $14_2$ against which the second valve body $2_2$ can be seated.

In addition, the first outlet $12_1$ is larger in diameter than the second outlet $12_2$. Correspondingly, the first valve body $2_1$ is also larger in diameter than the second valve body $2_2$ and, in a manner similar to the second embodiment, the solenoid 9 is disposed to enclose the first plunger tube $4_1$ into which is inserted the first moving core $3_1$ having connected thereto the large-diameter first valve body $2_1$. Further, in the same manner as in the first and second embodiments, when the solenoid 9 is deactivated, the distance L1 between the first stationary core $5_1$ and the first buffer member $6_1$ is arranged to be different from the distance L2 between the second stationary core $5_2$ and the second buffer member $6_2$.

When the solenoid 9 is deactivated, the first and second valve bodies $2_1$, $2_2$ are seated against the respective valve seats $14_1$, $14_2$ by the biasing forces of the first and second valve springs $7_1$, $7_2$. In this manner, the first and second flow passages become the state in which they are respectively open to flow only through the respective bypasses $16_1$, $16_2$.

As a result, the flow resistances of the first and second flow passages respectively become large. When the solenoid 9 is activated, on the other hand, the first and second valve bodies $2_1$, $2_2$ leave the respective valve seats $14_1$, $14_2$ to thereby attain a state in which the first and second gas flow passages are open to passage also through each of the first and second valve chambers $13_1$, $13_2$. The flow resistances in the respective flow passages therefore become small.

By the way, a proportional valve is interposed in the gas supply passage on the upstream side of the second inlet $11_2$. The electric current to the proportional valve is controlled so that the fuel gas can be supplied in an amount corresponding to the requested amount of combustion. Further, in order to keep constant the air-fuel ratio of the air-gas mixture to be supplied to the burner B, the number of revolution of the fan F is controlled depending on the requested amount of combustion. However, in case the requested amount of combustion becomes smaller than a predetermined value whereby the number of revolution of the fan F becomes smaller than the lower-limit number of revolution at which the proportional characteristics of the air blowing amount of the fan F can be maintained, or in case the electric current to the proportional valve becomes smaller than the lower-limit electric current value at which the proportional characteristics of the gas supply amount can be maintained, it will no longer be possible to supply the amount of air or fuel gas corresponding to the requested amount of combustion.

As a solution, in the third embodiment, when the requested amount of combustion has fallen below the predetermined value, the activation of the solenoid 9 is stopped to thereby increase the flow resistance in each of the first and second flow passages. According to this arrangement, without making the number of revolution of the fan F below the above-described lower-limit number of revolution or without making the electric current to the proportional valve below the above-described lower-limit electric current value, the amount of air or fuel gas corresponding to the requested amount of combustion below the predetermined value can be supplied. Further, since the first valve body $2_1$ for air and the second valve body $2_2$ for the fuel gas are simultaneously changed over with a single solenoid 9, there can be prevented the air from temporarily becoming excessive due to the delay in closing the first valve body $2_1$, or there can be prevented the gas from second valve body $2_2$ from temporarily becoming excessive due to the delay in closing the first valve body $2_1$.

Descriptions have so far been made of the embodiments of this invention with reference to the drawings. This invention shall, however, be not limited to the above. For example, the first and second buffer members $6_1$, $6_2$ may be disposed on (in contact with) the first and second stationary cores $5_1$, $5_2$, respectively. Further, the first and second valve seats may be disposed so as to respectively face the upper sides of the first and second valve chambers $13_1$, $13_2$ so that the first and second valve bodies $2_1$, $2_2$ may be seated against the first and second valve seats, respectively, when the solenoid 9 is activated. Still furthermore, in the above-described second embodiment, the second valve chamber $13_2$ may be provided, in addition to the second valve seat $14_2$ on the upper surface, with a third valve seat on the lower surface. In this arrangement, when the solenoid 9 is activated, the second valve body $2_2$ leaves the third valve seat so that the second valve chamber $13_2$ comes into fluid communication with the second outlet $12_2$ through an opening formed through the third valve seat.

In addition, in the gas supply passage on the upstream side of the second inlet $11_2$ of the single coil dual solenoid valve according to the third embodiment, there may be interposed, instead of the proportional valve, a zero governor which controls the secondary gas pressure to atmospheric pressure. Further, the third embodiment is a single coil dual solenoid valve in which each of the first and second bypasses $16_1$, $16_2$ is disposed to change over the flow resistances in the first flow passage for the air and in the second flow passage for the fuel gas between large and small resistances. It may alternatively be so arranged that, instead of providing each of the bypasses $16_1$, $16_2$, the first and second flow passages are respectively and simply made open to, or closed to, fluid communication. Further, it is also possible to cause two fluids other than air and the fuel gas to flow through the first and second flow passages.

What is claimed is:

1. A single coil dual solenoid valve comprising:
   a first valve body and a second valve body;
   a first moving core and a second moving core having connected to one end thereof the first valve body and the second valve body, respectively;
   a first plunger tube and a second plunger tube having slidably inserted thereinto from open end provided at one end portion thereof the first moving core and the second moving core, respectively;
   a first stationary core and a second stationary core disposed at an opposite end portion of the first plunger tube and of the second plunger tube so as to lie opposite to the first moving core and the second moving core, respectively;
   a first buffer member and a second buffer member attached to the first moving core and the second moving core or to the first stationary core and the second stationary core so as to absorb shocks when the first moving core and the second moving core come into contact with the first stationary core and the second stationary core, respectively;
   a first valve spring and a second valve spring for biasing the first moving core and the second moving core away from the first stationary core and the second stationary core, respectively;
   a first frame disposed to connect the first stationary core and the second stationary core;
   a second frame disposed to connect the one end portion of the first plunger tube and of the second plunger tube, respectively; and
   a single solenoid disposed to enclose one of the first plunger tube and the second plunger tube,
   wherein a magnetic path is formed starting from the first moving core through the first stationary core, the first frame, the second stationary core, the second moving core, the second frame and back to the first moving core such that, when the solenoid is activated, each of the first moving core and the second moving core is sucked to move against a biasing force of each of the first valve spring and the second valve spring toward the first stationary core and the second stationary core, respectively, thereby changing over the first valve body and the second valve body; and
   further comprising a valve casing containing therein:
   a first valve chamber for housing therein the first valve body;
   a second valve chamber for housing therein the second valve body, the first valve chamber and the second valve chamber being disposed in parallel with each other;
   a first valve seat which faces the first valve chamber and against which the first valve body can be seated;

a second valve seat which faces the second valve chamber and against which the second valve body can be seated, such that, when the solenoid is activated, one of the first valve body and the second valve body gets seated against corresponding one of the first valve seat and the second valve seat and that, when the solenoid is deactivated, the other of the first valve body and the second valve body gets seated against the other of the corresponding first valve seat and the second valve seat, whereby a flow rate is changed over depending on the activation or deactivation of the solenoid.

2. The single coil dual solenoid valve according to claim 1, wherein, when the solenoid is deactivated, a distance between the first stationary core or the first moving core and the first buffer member is different from a distance between the second stationary core or the second moving core and the second buffer member.

3. The single coil dual solenoid valve according to claim 1, further comprising:
a first flow passage having interposed therein the first valve chamber for housing therein the first valve body;
a second flow passage having interposed therein the second valve chamber for housing therein the second valve body, the first flow passage and the second flow passage being disposed in parallel with each other,
whereby fluids different in kind are capable of flowing through the first flow passage and the second flow passage, respectively.

4. The single coil dual solenoid valve according to claim 1, wherein in case the first valve body and the second valve body are different from each other in diameter, the solenoid is disposed to enclose the plunger tube into which is inserted the moving core to which is connected the valve body of larger diameter out of the first plunger tube and the second plunger tube.

* * * * *